United States Patent [19]

Siebert

[11] Patent Number: 5,151,585
[45] Date of Patent: Sep. 29, 1992

[54] COHERENT RADIATION DETECTOR

[75] Inventor: Edward T. Siebert, New Fairfield, Conn.

[73] Assignee: Hughes Danbury Optical Systems, Inc., Danbury, Conn.

[21] Appl. No.: 744,204

[22] Filed: Aug. 12, 1991

[51] Int. Cl.[5] .............................................. G01V 1/20
[52] U.S. Cl. .................................. 250/201.9; 356/352
[58] Field of Search ............................ 250/201.9, 216; 356/346, 352

[56] References Cited

U.S. PATENT DOCUMENTS 4,222,667  9/1980  Layne .................................. 356/352
4,682,025  7/1987  Livingston et al. ............... 250/201.9

Primary Examiner—David C. Nelms
Attorney, Agent, or Firm—W. K. Denson Low; W. J. Streeter; R. A. Hays

[57] ABSTRACT

A CW and/or pulse coherent radiation detection system (10) includes at least one radiation detector (14) having a plurality of discrete radiation detector elements (A–D) disposed upon a surface thereof. A coherence length discriminator (CLD), for example an etalon (12), is constructed so as to vary an optical path length therethrough at a plurality of locations. The CLD is disposed relative to the radiation detector such that radiation passing through the CLD is received by the discrete radiation detector elements. The apparatus further includes a drive (16) for translating the CLD relative to the radiation detector so as to modulate only coherent radiation passing through the CLD. The drive is preferably a reactionless drive having an energy consumption made small by the use of small CLD motions that correspond to the dimensions of individual detector elements. The coherent radiation detector is also shown to be usable for detecting an angle of arrival of coherent radiation.

32 Claims, 11 Drawing Sheets

ETALON AND DETECTOR ARRAY ALIGNED

ETALON AND DETECTOR ARRAY MISALIGNED-WORST CASE

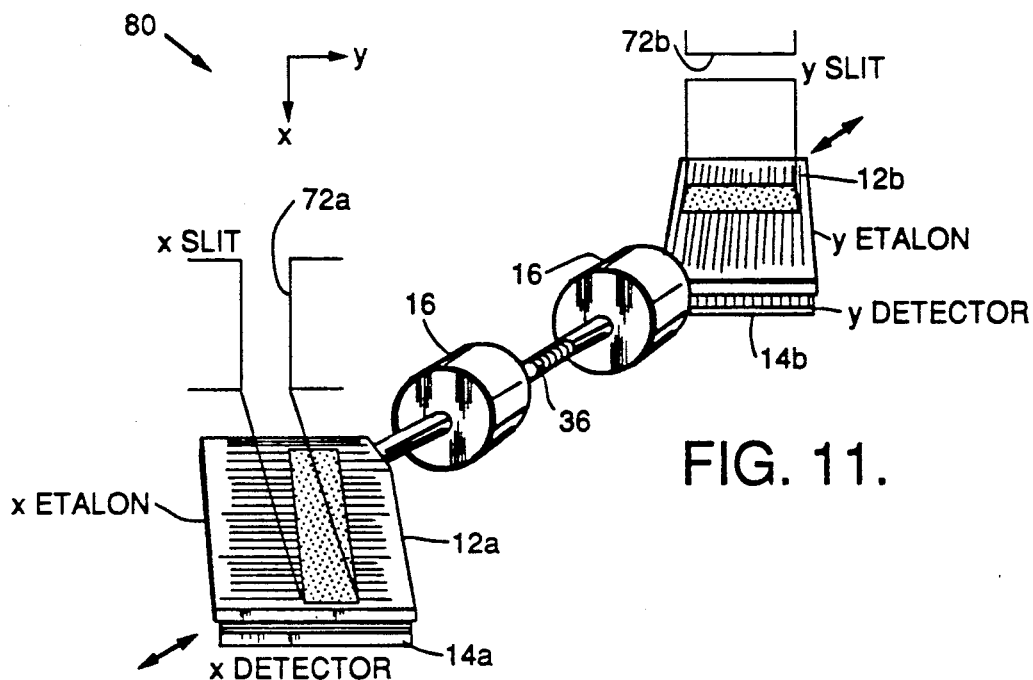
FIG. 11.
FIG. 5b.
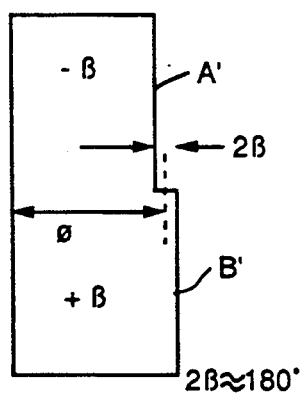
FIG. 5a.
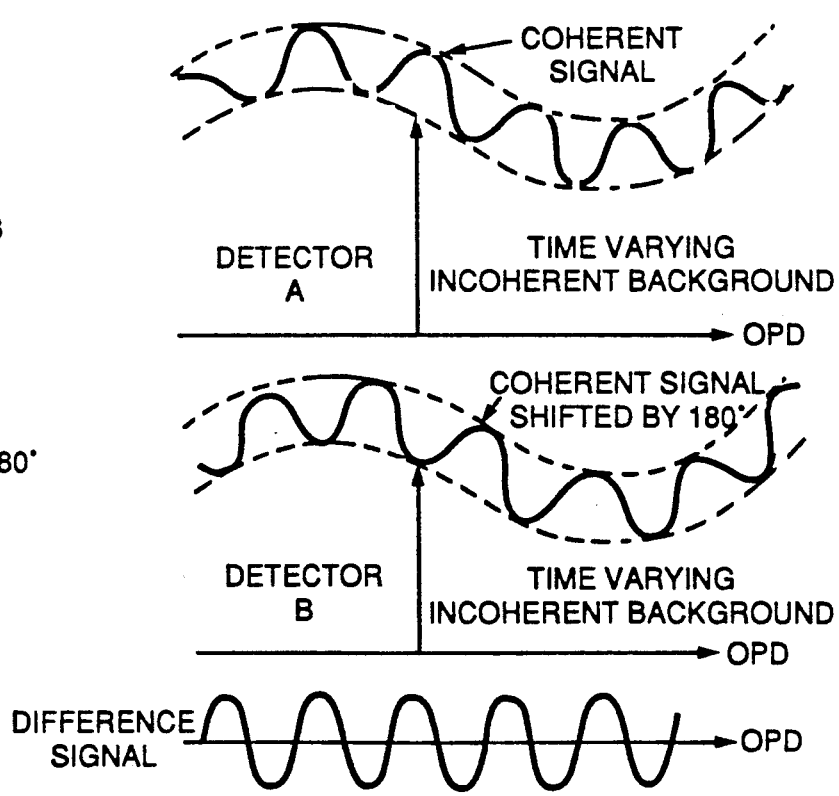

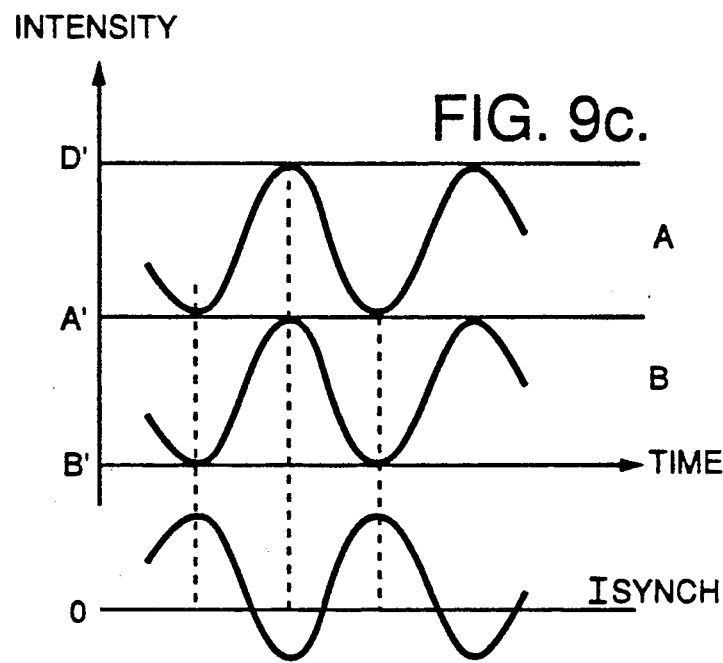
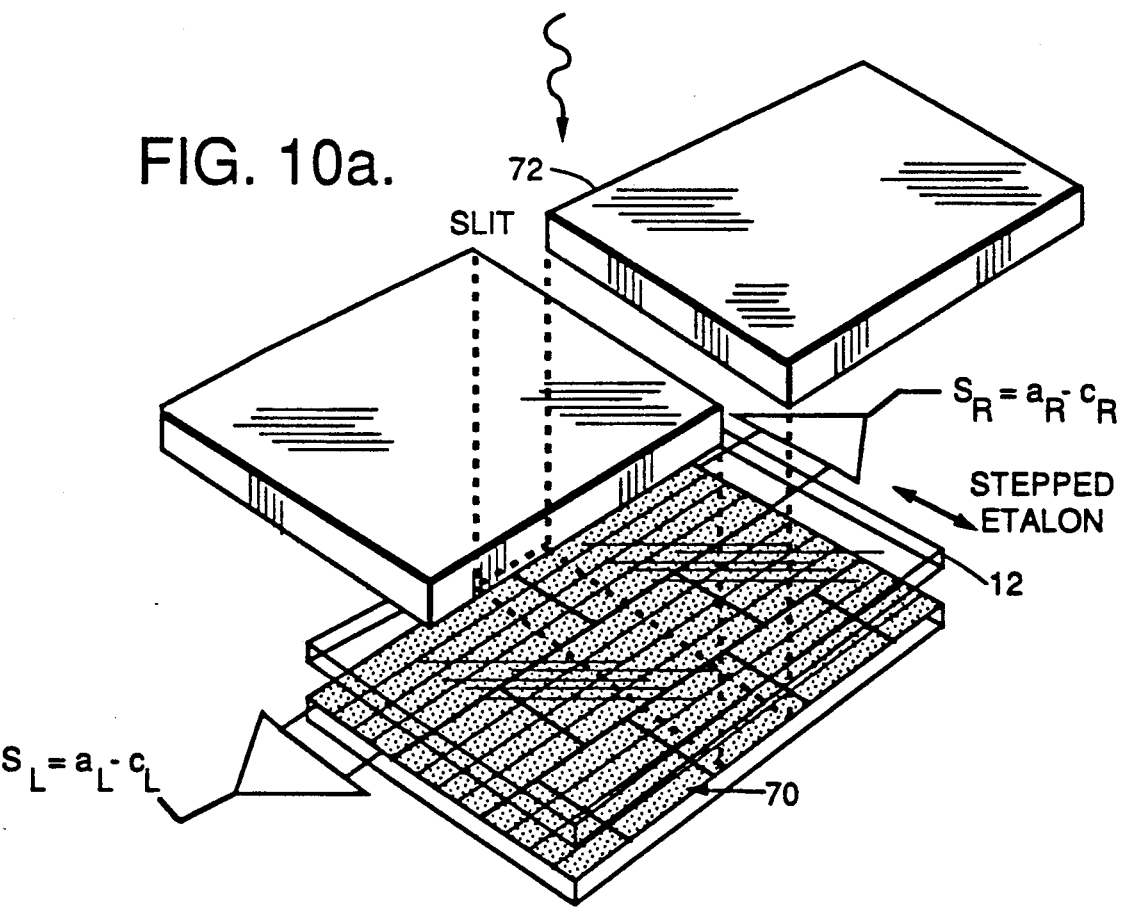

COHERENT RADIATION DETECTOR

FIELD OF THE INVENTION

This invention relates generally to ratiation detection apparatus and, in particular, to continuous wave (CW) detectors of coherent radiation.

BACKGROUND OF THE INVENTION

A coherence length discriminator (CLD) is a device that produces intensity variations (fringes) for radiation having a coherence length substantially longer than that of the CLD, referred to as coherent radiation, while producing little or no intensity variations for radiation having a coherence length substantially shorter than that of the CLD, referred to as incoherent radiation. Any unequal path interferometer may function as a CLD. Examples include a Fabry-Perot etalon, a Fizeau interferometer, Michaelson (parallel or filter mirrors) interferometers, and other interferometer types. The optical path difference (OPD) between reflectors determines the coherence length.

The detection of pulsed laser radiation in the presence of background radiation is described in U.S. Pat. No. 4,536,089, "Analyzer for Coherent Radiation", issued Aug. 20, 1985 to the present inventor, and also in U.S. Pat. No. 4,309,108, "Analyzer for Coherent Radiation", issued Jan. 5, 1982, also to the present inventor. In these U.S. Patents, a multi-stepped Fabry-Perot etalon is positioned in front of detector channels. For coherent illumination, the transmission of the etalon is a function of OPD. Step heights are chosen to have an OPD of approximately one half wavelength.

Reference is also made to U.S. Pat. No. 4,170,416, "Apparatus for Analyzing Coherent Radiation", issued Oct. 9, 1979 to Carroll R. Fencil, wherein a Fabry-Perot etalon has regions of different thickness and is disposed between a source of coherent radiation and detector elements. Modulation with respect to the source of coherent radiation is effected by angular movement of the entire unit, by mounting the unit in a moving vehicle, aircraft, or rotating mechanisms.

Reference is also made to the teaching of U.S. Pat. No. 4,806,747, issued Aug. 15, 1989, entitled "Optical Direction Sensor Having Gray Code Mask Spaced from a Plurality of Interdigitated Detectors", and U.S. Pat. No. 4,806,747, issued Feb. 21, 1989, entitled "Optical Direction of Arrival Sensor with Cylindrical Lens", both to Dunavan et al. These patents teach optical direction sensors.

U.S. Pat. No. 3,824,018, "Coherent Light Source Detector", issued Jul. 16, 1974 to Robert Crane, Jr. describes a Fabry-Perot etalon that is mounted so as to be pivotable or rotatable about an axis parallel to its surfaces. The entire etalon rotates about the axis Radiation transmitted by the etalon falls on a radiation sensitive surface of a radiation detector. The detector may rotate with the etalon or may be stationary. In one embodiment a surface of the etalon has two regions, each region being spaced by a different amount from an opposite surface. The spacing is said to be an exact odd multiple of quarter wavelengths of the coherent radiation being detected, divided by the index of refraction.

Although well suited for their intended uses, the teaching of these patents are not readily compatible with pulse detection techniques. Also, detector apparatus employing the teaching of these patents are not immune to atmospheric scintillation, detector nonuniformities, and detector microphonics. Furthermore, these and other techniques may require that a target or platform be in motion so as to generate modulation, or that the laser detector etalon be rotated or scanned through relatively large angles in order to modulate the CW signal. Typically, the resultant modulation is restricted to low frequencies and also requires bearings or high angle flexures, having a limited life, in order to achieve the modulation. In addition the typically large excursions require high power.

Furthermore, previous CW detector approaches have not exhibited a compatibility with pyroelectric detectors. This type of detector is advantageous in that it does not require cooling. However, pyroelectric detectors suffer from microphonics, especially at the low modulation frequencies obtained from conventional CW detector assemblies.

It is also noted that while the previous teachings may show a plurality of etalon elements and detector elements, a given detector element A is always associated with an etalon element A. That is, these previous teachings do not show an etalon translated in such a manner as to move an etalon element B relative to a detector element A.

It is thus one object of the invention to provide method and apparatus that overcomes these deficiencies while improving an ability to detect CW coherent radiation.

It is another object of the invention to provide a CW detector assembly having a higher modulation frequency than that obtained previously and that subtracts out microphonic noise, while adding desired signals, thus providing compatibility with pyroelectric detectors.

Another object of the invention is to provide a CW radiation detector assembly having significantly reduced mechanical motions, relative to conventional CW detectors, and that furthermore provides a high degree of mechanical isolation.

It is a further object of the invention to provide CW wavelength and Direction of Arrival (DOA) capability in conjunction with a quad cell, bicell or gray code techniques.

It is another object of the invention to provide apparatus for detecting CW laser radiation, the apparatus exhibiting a wide Field of View (FOV), a wide spectral passband, high coherence discrimination, a compatibility with existing pulse detection technology, an immunity to atmospheric scintillation, and an insensitivity to detector nonuniformities and microphonics.

It is one still further object of the invention to provide apparatus having the above mentioned features for detecting a CW laser signal that is buried below an incoherent background through the use of background subtraction techniques.

SUMMARY OF THE INVENTION

The foregoing and other problems are overcome and the objects of the invention are realized by apparatus and method for detecting the presence of continuous wave coherent radiation. In accordance with the invention a coherence length discriminator includes at least one radiation detector having a plurality of discrete radiation detector elements disposed upon a surface thereof. In accordance with a preferred embodiment a Fabry-Perot etalon has a first surface for receiving radiation and a second surface, at a longer OPD, that is constructed so as to vary an optical path length therethrough at a plurality of locations. The second surface of the etalon is disposed relative to the radiation detector such that radiation passing through the etalon is received by the discrete radiation detector elements. The apparatus further includes an etalon driver for repetitively translating the etalon motion relative to the radiation detector so as to modulate only continuous wave coherent radiation passing through the etalon.

The etalon driver is preferably a reactionless drive having an energy consumption made small by the use of small etalon motions corresponding to the dimensions of individual detector elements, which have dimensions that are short compared to atmospheric scintillation variations, or seven millimeters for sunlight, and/or detector nonuniformities or overall size. Typical dimensions are in the range of 100 micrometers to 200 micrometers. A total excursion of the etalon need be no greater than the dimension of a detector element. The physical form of the etalon, as a solid plate driven within a plane, renders the etalon very stiff and, hence, provides a high self-resonance frequency. A solid etalon is also extremely stable and virtually immune to misalignment.

The teaching of the invention also enables the construction of a direction of arrival detector that is highly responsive to CW coherent radiation, as well as wavelength determination from the received signals.

BRIEF DESCRIPTION OF THE DRAWING

The above set forth and other features of the invention are made more apparent in the ensuing Detailed Description of the Invention when read in conjunction with the attached Drawing, wherein:

FIG. 5a shows a coherent signal obtained from two detector elements due to an optical path difference through the etalon;

FIG. 5b illustrates a step height relationship for two adjacent etalon steps;

FIG. 9a shows a sample and hold and a switch demodulator embodiment while FIG. 9c illustrates waveforms associated with two channels of the synchronous demodulator of FIG. 9b;

FIG. 10a shows an embodiment of a direction of arrival (DOA) detector system that includes a gray code detector;

FIG. 10b illustrates circuitry for selecting a location code of a largest signal (in phase or quadrature) for the gray code detector of FIG. 10a; and FIG. 11 shows an embodiment of a DOA system that determines DOA in two directions by having a pair of etalons disposed at 45° to a motion axis of a reactionless etalon drive.

DETAILED DESCRIPTION OF THE INVENTION

The disclosure of the above mentioned U.S. Patents, specifically U.S. Pat. No. 4,857,721, U.S. Pat. No. 4,806,747, U.S. Pat. No. 4,536,089, U.S. Pat. No. 4,170,416, U.S. Pat. No. 4,309,108, and U.S. Pat. No. 3,824,018, are incorporated by reference herein.

Figure 1:
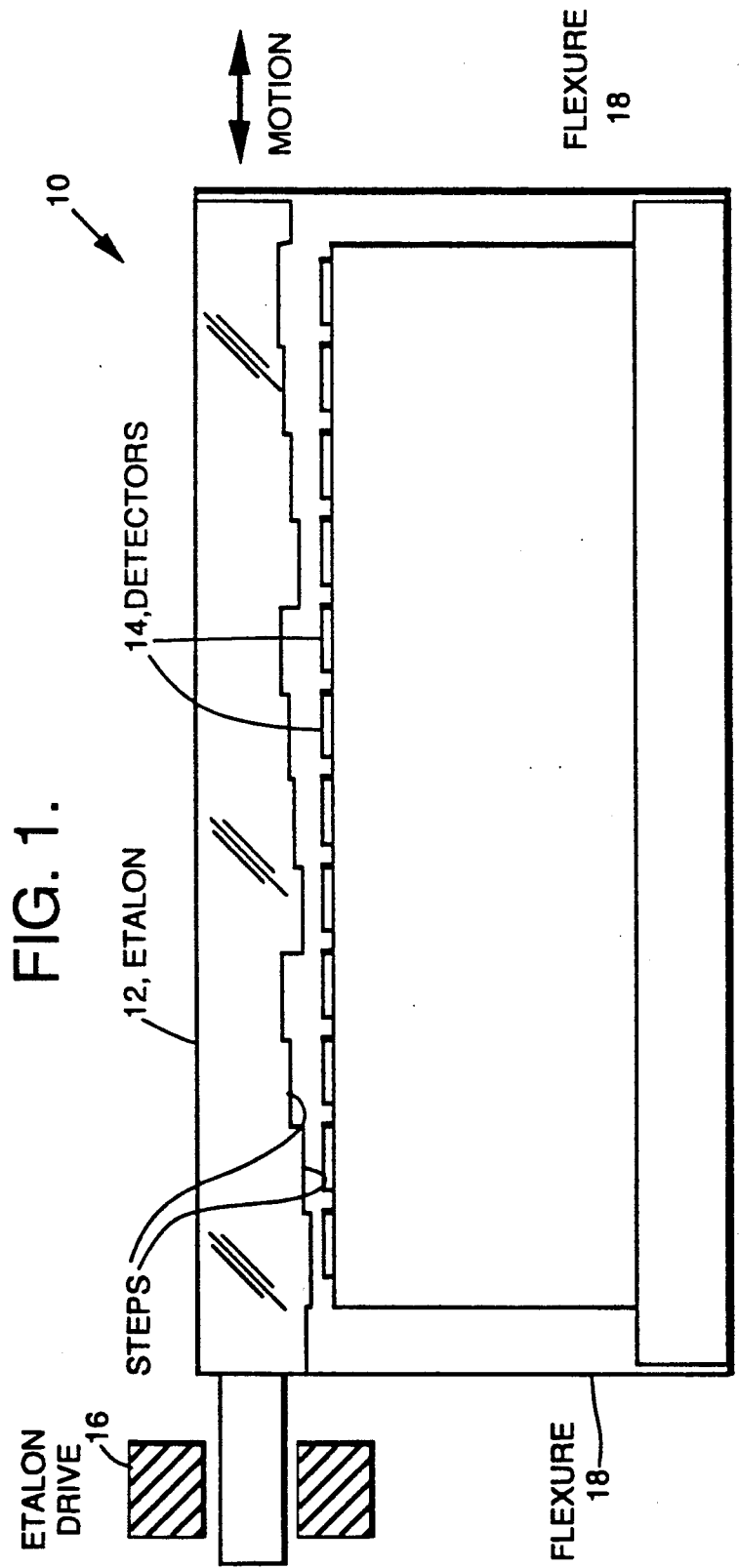
FIG. 1 is a cross sectional view showing a flexure mounted multi-stepped etalon 12 disposed relative to a plurality of detector elements, the detector motion being in a plane parallel to the detector elements.

As seen in FIG. 1 a CW radiation detector assembly 10 includes a multistep interdigitated etalon 12 mounted in close proximity to, or that is imaged onto, an interdigitated detector 14. An etalon drive 16, in conjunction with flexures 18, translates the etalon 12 in a systematic fashion within a plane of the etalon such that etalon elements or steps are sequentially registered with detector 14 elements in a systematic manner. Etalon 14 motion occurs primarily in a plane parallel to the detectors 14. For a simplest embodiment, wherein the detectors 14 and the etalon 12 elements are both stripe-like in area, etalon 12 stripes are successively registered with detector 14 stripes. Sinusoidal, linear, or other motions are also within the scope of the invention, with corresponding demodulation techniques. The etalon 12 motion may be perpendicular to the stripes, or may occur at other angles, such as 45°. However, etalon 12 motion may not occur at an angle of 0° with respect to the detectors 14. Other detector/etalon element configurations, such as the square or rectangular area configuration of a 2-dimensional detector array, and other motions, such as circular, ellipsoidal, etc., are also within the scope of the teaching of the invention. It is also within the scope of the invention to provide the etalon steps or elements as differing regions of material that present differing optical path length differences to incoming CW coherent radiation.

In addition to a Fabry-Perot etalon with parallel surfaces, the invention also encompasses the use of other unequal path interferometers. These include a wedged etalon, referred to as a Fizeau, in which the wedge replaces the steps; and a stepped or tilted (wedged) Michaelson interferometer, such as a Fourier Transform Spectrometer, in which one or both mirrors are translated, rotated, or otherwise moved in or out of plane to achieve the same or a similar modulation effect. In general, the invention may be practiced with any suitable interferometer configured to achieve the same purpose.

Furthermore, while a prime use of the invention is for detecting optical signals (UV, VIS, IR), the invention may also be used to advantage in the detection of radiation in other parts of the electromagnetic spectrum (e.g. X-Ray, microwaves/radar) and also to the detection of non-electromagnetic waves (e.g. acoustic signals).

As such, the specific embodiments described in detail below are not intended to be read in a limiting sense.

Figure 2:
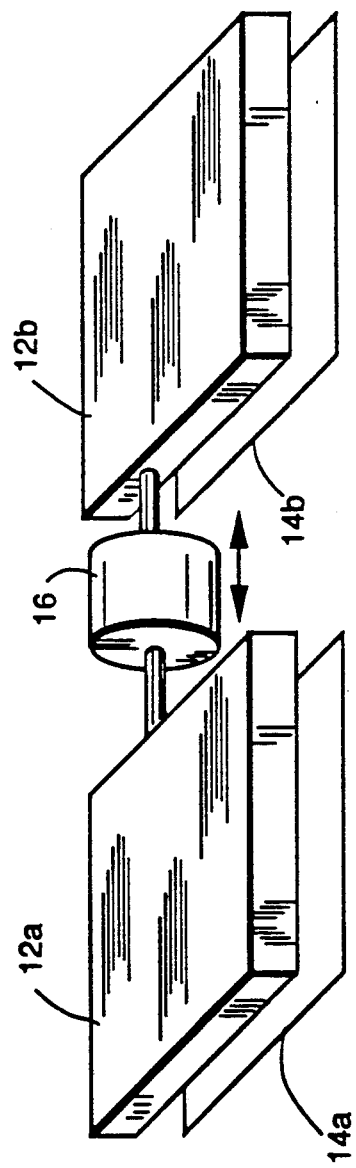
FIG. 2 shows a pair of multi-stepped etalons disposed relative to a pair of detectors and a reactionless drive for translating the etalons relative to the detector.

FIG. 2 shows an embodiment wherein a pair of etalons 12a and 12b are used in conjunction with a pair of detectors 14a and 14b. When such pairs are used, it is preferable to provide a reactionless drive by pushing one etalon 12 against the other. This technique also minimizes the generation of vibrations that may affect the detectors 14 or other components of the system.

Figure 3:
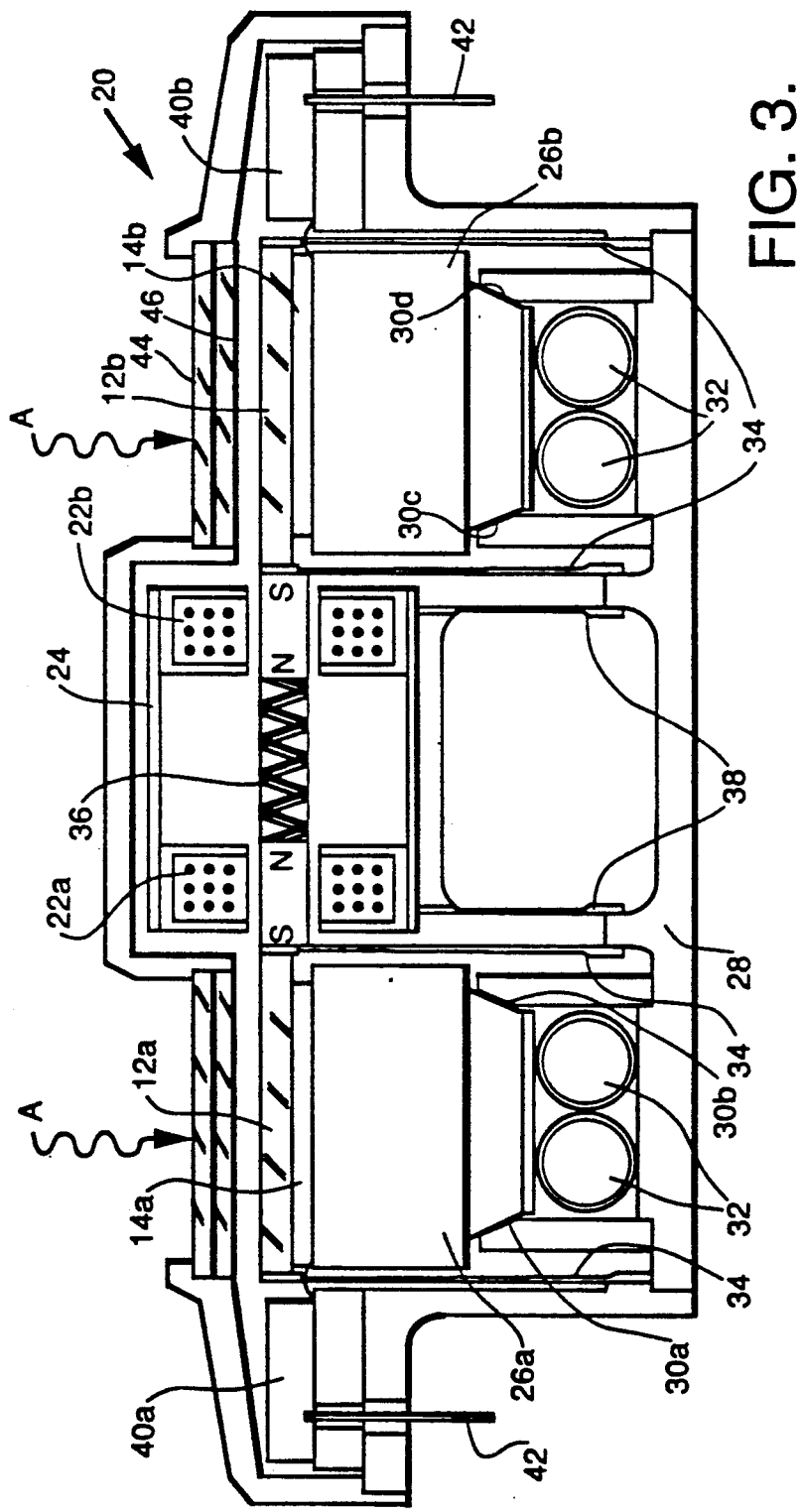
FIG. 3 is a cross sectional view of a CW radiation detector assembly that shows a pair of multi-stepped etalons and an embodiment of the reactionless drive system.

FIG. 3 depicts an assembly 20 wherein such etalon/detector pairs are employed in conjunction with a reactionless drive system. Each of the etalons 12a and 12b have an associated voice coil driver 22a and 22b, the drivers 22a and 22b being attached to and pushing against one another through a common mount 24. Detectors 14a and 14b are each mounted on thick BeO blocks 26a and 26b to prevent ending (microphonics), and are also mechanically coupled to a base 28 through rubber mounting pads 30a, 30b, 30c, and 30d so that no bending modes are excited (neutral points) and vibration is isolated from the base 28. The BeO blocks 26a and 26b also provide good thermal conductivity to underlying copper heat coils 32. The etalons 12a and 12b are each coupled to etalon isolation flexures 34 and each pushes against the other through a stiff spring 36 designed for resonance. Voice coil isolation flexures 38 are also included. The detectors 14a and 14b are wire bonded to associated detector electronics packages 40a and 40b having wiring 42 that exits the assembly 20 for coupling to external circuitry A transparent window 44 and EMI shield 46 provide an input for the radiation, indicated by the arrows labeled A, that is detected by the assembly 20.

It should be noted that such extensive mechanical isolation may only be required with detectors, or other components, that exhibit a high sensitivity to microphonics, and even then not all of the described isolation elements may be required.

The energy consumption of the reactionless drive is made extremely small by the use of small etalon motions that correspond to the dimensions of individual detector elements having dimensions in the range of 100 micrometers to 200 micrometers. That is, the total excursion of an etalon 12 need be no greater than the dimension of an underlying detector 14 element, although larger excursions covering several elements may be used to generate modulation frequencies higher than the drive frequency. The use of resonance also reduces power consumption by the reactionless drive. Only the energy lost in the etalon 12 mounting, which is very low for flexures, and that lost due to drive inefficiencies, need be supplied.

The use of small detector elements and, hence, corresponding small etalon motions gives rise to another advantage: an ability to modulate the incoming CW radiation at high frequencies. Many conventional drivers have a frequency-excursion limitation. However, by requiring only very small excursions the modulation frequency can be greatly increased. The form of the etalon 12 itself, as a solid plate driven through its plane, renders the etalon 12 very stiff and, hence, provides a high self-resonance frequency.

Figure 4A:
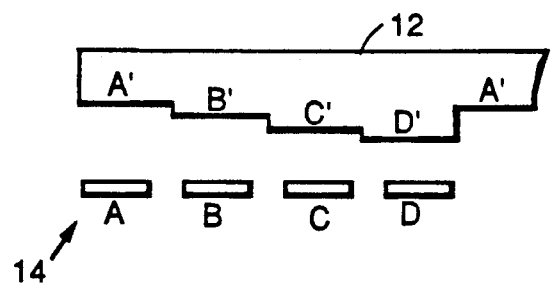
FIGS. 4a and 4b show a condition wherein each step of the etalon is aligned with a detector element.
Figure 4B:
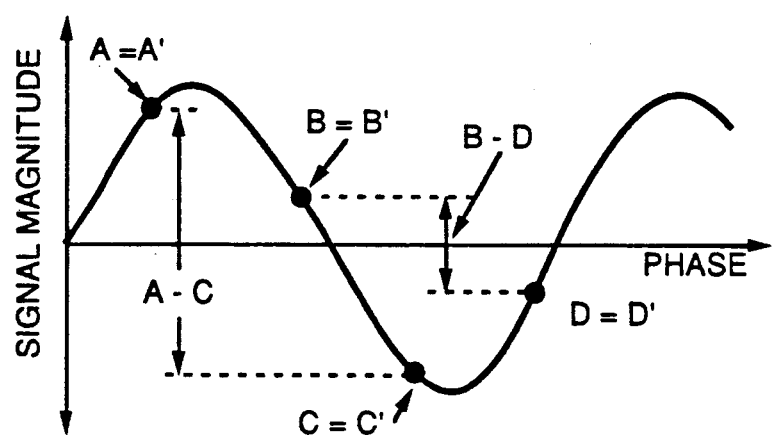
Figure 4C:
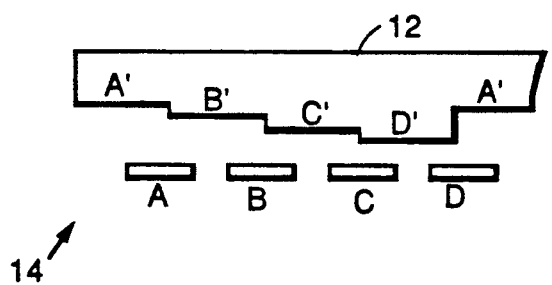
FIGS. 4c and 4d show a worst case detector/etalon misalignment.
Figure 4D:
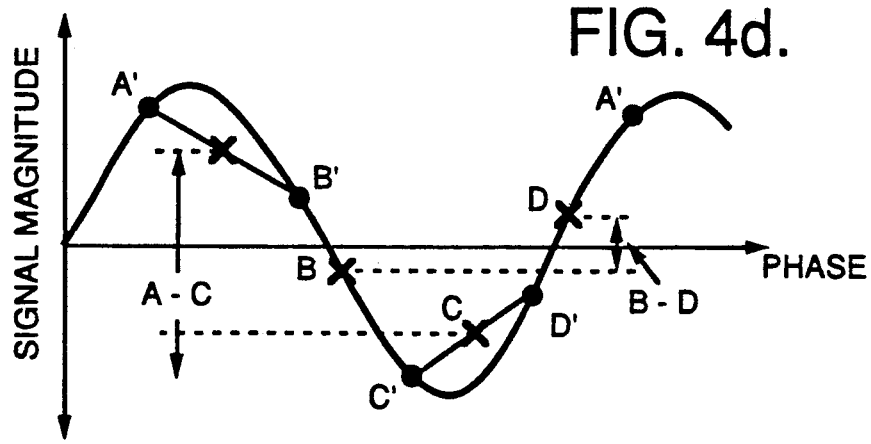

As is depicted in FIGS. 4a-4d modulation of the incident CW radiation is accomplished by moving the etalon 12 past the detector elements, with a back and forth oscillatory motion, by a distance corresponding to one or more etalon steps. FIGS. 4a and 4b represent an etalon/detector in alignment, while FIGS. 4c and 4d represent a worst case etalon/detector misalignment. Each etalon 12 has sets of steps A', B', C', and D', corresponding to detector 14 elements A-D. For the aligned case (FIG. 4a) each detector element (A-D) sees a signal transmitted through one etalon step (FIG. 4b). For the misaligned case (FIG. 4c) each detector element sees an average signal transmitted through two etalon steps (FIG. 4d).

To a first approximation, the averaged coherent modulation is proportional to $$\sqrt{1 - 4\delta(1 - \delta)\sin^2\beta/2}$$

where $\delta$ is the amount of misalignment in detector elements (crosstalk) and $\beta$ is the phase difference across the step. Crosstalk is most severe when $\delta = \frac{1}{2}$ (i.e. each etalon step contributes $\frac{1}{2}$ the signal to a detector, as shown in FIG. 4c). In this case the modulation is proportional to $\cos \beta/2$. The smaller the value of $\beta$, the higher is the modulation. In the four step arrangement shown is typically of the order of 90°, so that a worst case modulation is 70.7% of an ideal modulation. Thus, the percent of modulation is still quite high, which results in the detection of optical pulses, with little degradation, independent of the position of the etalon 12. Furthermore, any configuration in which $\cos \delta/2$ is significantly greater than zero is backwards compatible with the single pulse detection techniques described in the above referenced U.S. Pat. Nos. 4,309,108 and 4,536,089, and further allows combined CW and pulse detection. Values of other than 90° also provide acceptable pulse detection so long as $\cos \beta/2$ is made significantly large.

Because of the back and forward motion of the etalon 14 light passed by etalon step A' successively illuminates detector elements A, B, etc. As a result, detector element A sees etalon steps A', B', etc. in a sequential manner.

This is an important aspect of the invention, because for incoherent light all etalon steps have the same transmission properties and, hence, no transmission variation exists to produce a modulation of the light. For fully incoherent light, etalon step transmission properties may be matched to a small fraction of 1%. However, for coherent signals, interference effects cause each etalon 12 step to have a different transmission, depending on the wavelength of the incident light, and on the etalon 12 thickness (excluding the steps). The angle of arrival of the coherent signal also has a small effect. Preferably, the etalon 12 is designed such that its mean optical thickness ($2nd\cos\theta_n$), where n is the etalon index of refraction, d its average thickness, and $\theta_n$ the angle of the light in the etalon 12, is substantially larger than the coherence length of incoherent background sources, while also being substantially less than a coherence length of coherent sources that it is desired to detect. Thus, the average etalon 12 thickness determines the coherent/incoherent discrimination ability of the etalon 12. Referring to FIG. 5b, the step (A'-D') heights ($s_1$) are chosen such that, over the wavelength band of interest, the phase difference between non-adjacent steps is approximately 180°, so that signals add while the background is cancelled, and the phase difference between adjacent steps is kept small to provide good pulse detection.

While the etalon 12 step heights may be selected by several methods, and need not be equal, a simplest technique chooses the ith step height to be a multiple of a basic step ($s_o$) height, such that $S_i = (i)S_o$, which provides a linear range of step height across the etalon 12. The basic step height is chosen such that $2ns_o\cos\theta_n$ is approximately equal to lambda/4 ($\beta$ is approximately 90°). Thus, every second step produces a lambda/2 difference (180° phase difference) in optical path length, which in turn produces a maximum amount of modulation of the coherent light passing through the etalon. The middle of the band of wavelengths may be selected such that:

$$\sin\beta_{MIN} = \sin\beta_{MAX}$$

$$\beta = \frac{(2ns_o\cos\theta_n)}{\lambda} \, 2\%$$

$$\sin\beta > 0$$

The difference between two channels is proportional to $\sin\beta$ and is minimum at:

$$\sin\beta_{min} = \sin\frac{180°}{1+r}, \, r = \frac{\lambda_{max}}{\lambda_{min}}.$$

Thus, substantial modulation occurs even over wide spectral bands. For example, a three to one spectral range gives $r = 3$ and $\sin\beta > 0.70$. This spectral range is more than adequate for most detector ranges (e.g. 0.4 to 1.1 micrometers, 3 to 5 micrometers, or 8 to 12 micrometers). It is noted that some thermal detectors (e.g. pyroelectrics, thermopiles) may cover a 30 to 1 range, thus reducing modulation at the band edges to 0.1.

By having a greater number of etalon steps, or separated wavelengths of interest, a system having $\sin\beta >> 0$ at all wavelengths can be realized.

Background variations may occur at any frequency, but in general decrease rapidly with increasing frequency. Therefore, the modulation frequency is chosen to be sufficiently great so as to suppress most background variations (as well as 1/f noise).

In this regard three important attributes of the invention are as follows.

(A) The high modulation frequencies obtainable with small etalon 12 motions allow the effective suppression of the lower frequency background.

(B) The teaching of the invention provides a further ability to subtract out background variations and hence suppress the background variation such that coherent signals that are small compared to the background variations (even those at the modulation frequency), and very small compared to the dc background level, are still detectable.

(C) The teaching of the invention further provides an ability to identify and reject very large background variations that exceed a predetermined threshold, even after the background variation suppression provided as stated immediately above.

These attributes provide a correct identification of all incoherent background signals so that these signals can be eliminated.

FIG. 5a shows that when signals from two etalon 12 steps, having a step height of $2\beta$, are subtracted, the coherent signals (approximately 180° out of phase) add, while the incoherent background variations cancel. This enables background variations to be reduced by a significant amount, typically by a factor of 100 at all frequencies. The low frequency background is further rejected by multiple AC coupling within the system that highly attenuates frequencies below the modulation frequency.

To correctly identify large background variations as being incoherent, even though they may be near the modulation frequency, there is employed an adaptive threshold. The use of the adaptive threshold requires that a difference signal be larger than a small fraction of the sum, plus a noise threshold ($T_1$), for the signal to be classified as being coherent.

A signal is considered to be coherent if $$|S_i - S_j| > \epsilon(S_i + S_j) + T_1,$$

where $S_i$ and $S_j$ are both AC coupled, such that only variations in background or modulation are observed.

Figure 7A:
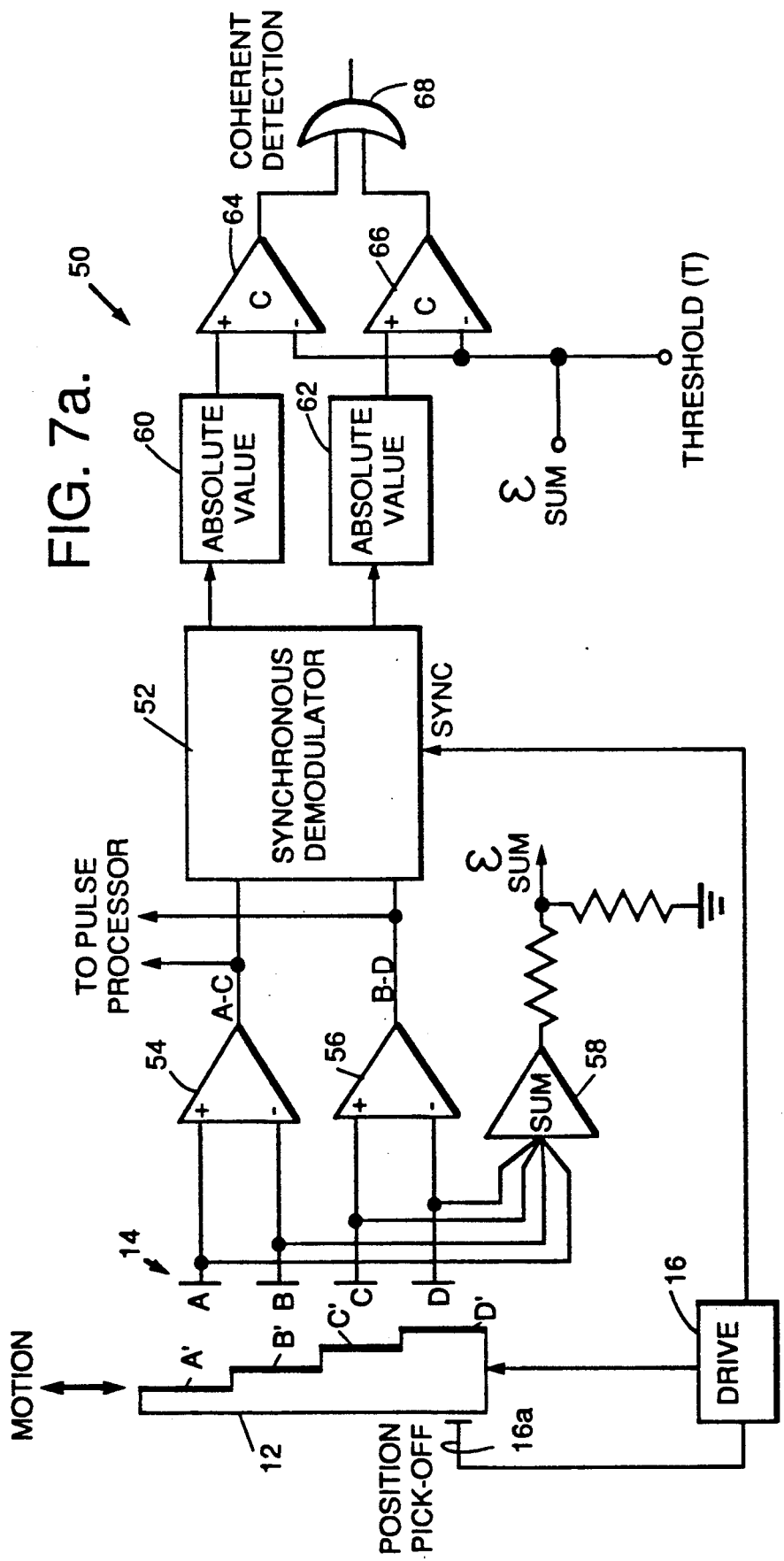
FIG. 7a is a block diagram showing circuitry for achieving coherent detection, the circuitry accommodating both CW and pulse detection.
Figure 7B:
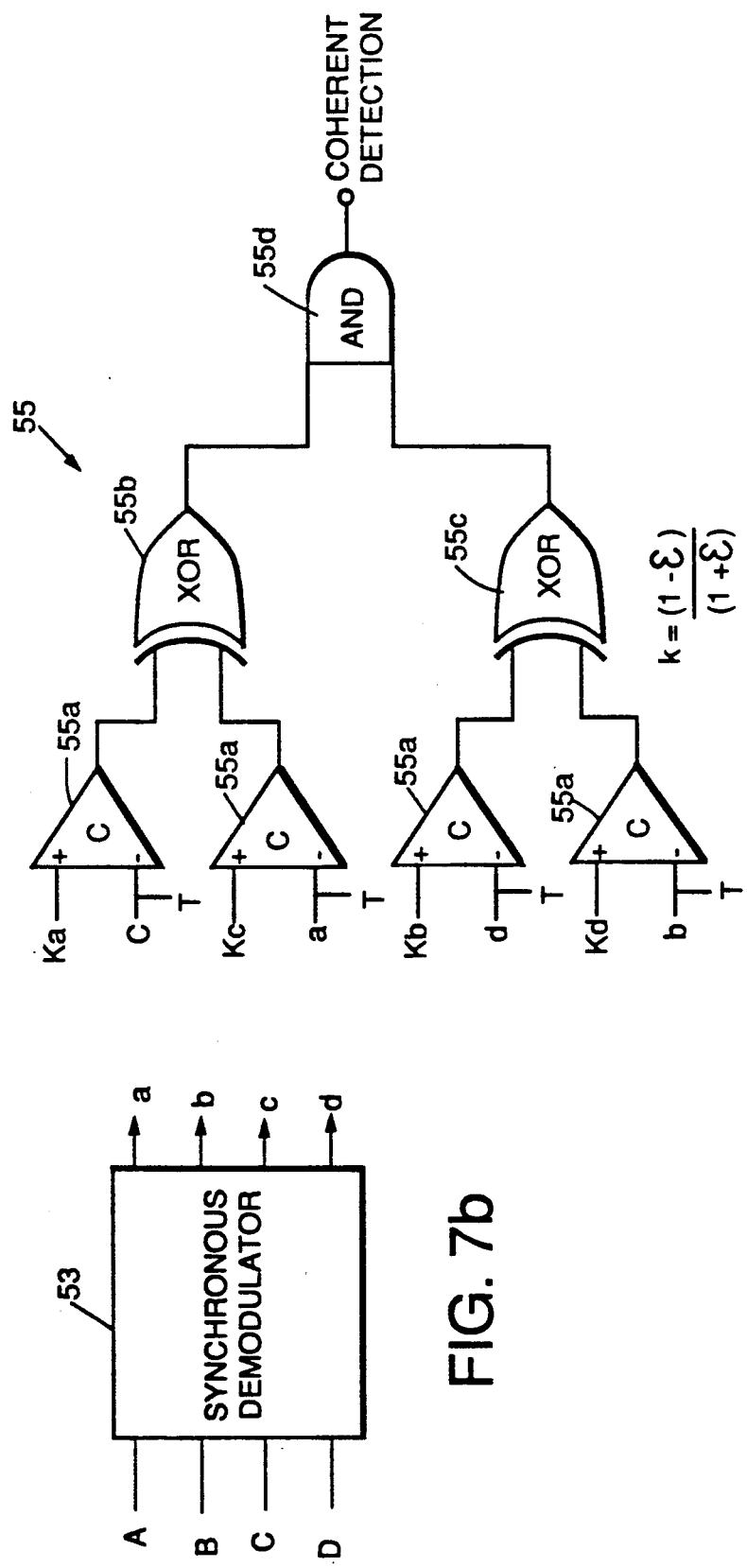
FIG. 7b is a block diagram showing alternate circuitry using k logic instead of absolute values for coherent detection.

This relationship is illustrated in FIG. 7a. The quantity $\epsilon$ is chosen to be substantially larger than any imbalances in the etalon/detector differences. The relationship can be rewritten as $$kS_i > S_j + T_2$$

or $$kS_j > S_i + T_2.$$

where $k = (1-\epsilon)/(1+\epsilon)$, and where $T_2 = T_1/(1+\epsilon)$, as shown in FIG. 7b.

K represents the decision logic typically employed for pulse detection. Thus, the coherence logic used for CW detection and pulse detection are essentially identical, enabling the same signals and some detection logic to be used for both. This provides for the system of the invention to detect both pulsed and CW radiation. By allowing pulses to feed through the CE demodulator, the same circuitry can be employed for both, resulting in a significant cost, weight, and power saving.

Figure 6:
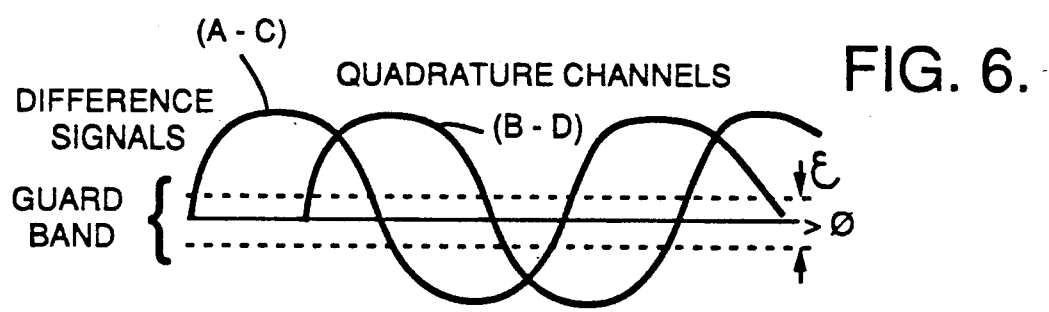
FIG. 6 is a diagram showing how the difference signal between two etalons varies with the average phase and the use of a quadrature channel to ensure the detection of coherent signals.

Generalizations of the detection logic are:

$$\left[\sum_j (\Sigma\alpha_{ji}S_i)^2\right] > \epsilon^2 \left[\sum_j (\Sigma\delta_{ji}S_i)^2\right] + th$$

where $\alpha_{jc}$ and $\delta_{jc}$ are chosen to optimize the decision logic for the average signal or the minimum worst case conditions. An example of this is the rss of the difference signal (steps A' and C') and the quadrature difference (step B' and D') in FIGS. 4 and 6, and the comparing of the rss of the difference and quadrature signals to the rss sum signal.

This commonality of processing shows that both CW and pulse signals may be processed using the same etalon/detector combination, thus enabling CW and pulse detection to be combined into a single system, thereby reducing hardware requirements. It may be readily verified that a short pulse occurring when the etalon 12 elements are registered to the detector 14 elements enables the pulse to be processed in an ideal manner. A worst case situation is presented when a pulse occurs while the etalon 12 steps are positioned half way over two detector 14 elements. In this case a processing loss can occur. However, when $\beta$ is 90°, the pulse difference signal loss was shown above to be only approximately 30% (i.e. 70% of the ideal value).

A combined CW and pulse detection system 50 is shown in FIG. 7a. The etalon 12 is shown aligned to the detectors 14. The etalon drive 16 includes a position pickoff 16a for determining a position of the etalon 12.

The drive 16 provides a synchronization (SYNC) signal output to a synchronous demodulator 52. Synchronous demodulator 52 receives difference signals (A−C and B−D) from subtractors 54 and 56, respectively. A summing circuit 58 sums A, B, C, and D detector element outputs to provide the sum signal. The synchronous demodulator 52 has two outputs, nominally in quadrature (FIG. 6), each of which is coupled to an input of absolute value circuits 60 and 62. Comparators 64 and 66 compare the outputs of the absolute value circuits 60 and 62 to the sum plus threshold value, T. Coherent detection is indicated by an output of the OR gate 68. The subtractors 54 and 56 outputs are also provided to a conventional pulse processor (not shown) for detecting pulses of radiation.

As depicted in the system 50 of FIG. 7a, if the CW filtering is performed last a significant amount of electronic processing is common for both pulse and CW detection. This commonality can be further enhanced by using, as shown in FIG. 7b, K logic, commonly used for pulse detection, for the CW channel as well. This enables common circuitry to be used for both. Furthermore, if the synchronous demodulators allow pulses to feed through, the CW and pulse processing are effectively combined.

In FIG. 7b the signals ABCD are processed by a feedthrough demodulator 53 which demodulates the CW while allowing fast pulses to feed through. The k-logic detection 55 block compares ka to c+T and kc to a+T, using comparators 55a and exclusive ORs (55b). The B and D signals are similarly processed and the two results are ANDed by gate 55d. This k-logic is mathematically identical to the logic of FIG. 7a and enables components developed for pulse processing to be used for CW processing as well.

In addition to the classification of a signal as being coherent or incoherent by the logic given above, it is also possible to determine wavelength. It can be readily verified that four etalon elements equally spaced provide:

$$S_1 = ST(\phi - 3\beta/2) + B\overline{T}$$

$$S_2 = ST(\phi - \beta/2) + B\overline{T}$$

$$S_3 = ST(\phi + \beta/2) + B\overline{T}$$

$$S_4 = ST(\phi + 3\beta/2) + B\overline{T}$$

For the above set forth equations S=signal, B=background, T$\phi$=etalon transmission, and $\overline{T}$ the background transmission. Furthermore, $$T(\phi) = (1-R)^2/(1+R^2-2R \cos \phi) = (1-R/1+R)[1+2R \cos \phi + 2R^2 \cos^2\phi]$$

This is approximately equal to $$[(1-R)/(1+R)][1+2 R \cos \phi] = \overline{T}[1+2R \cos \phi]$$

for small R.

So that the differences are independent of background:

$$S_{12} \sim 4S\overline{T}R \sin (\phi - \beta) \sin \beta/2$$

$$S_{23} \sim 4S\overline{T}R \sin (\phi) \sin \beta/2$$

$$S_{34} \sim 4S\overline{T}R \sin (\phi - \beta) \sin \beta/2$$

$$(S_{12} + S_{34})/2S_{23} = \cos \beta,$$

where $\beta = 2\pi$ (2nd cos $\theta_n$)/$\lambda$.

Figure 8A:
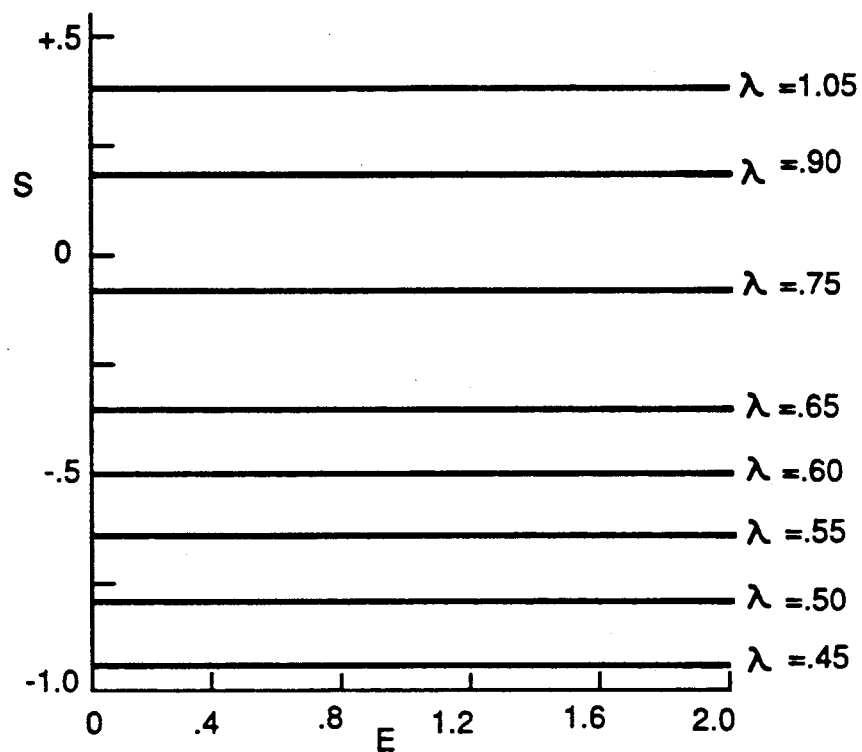
FIG. 8a illustrates a look-up table for obtaining wavelength for relatively small values of R.
Figure 8B:
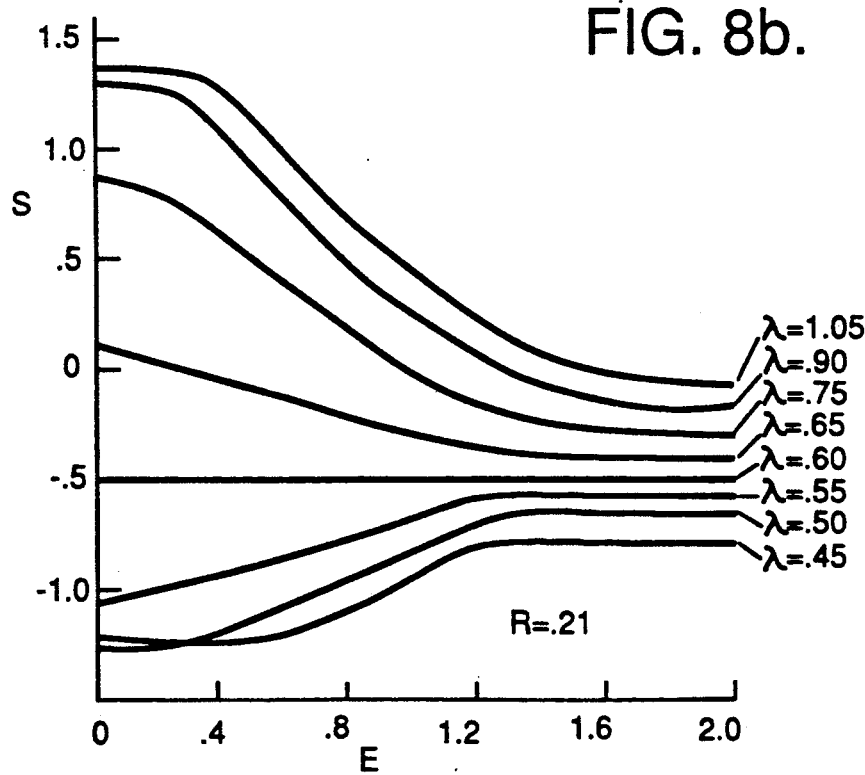
FIG. 8b shows a look-up table for obtaining a wavelength for a value of R equal to 0.21.

If $\beta$ is limited so that $0 < \beta < \pi$, cos $\beta$ is single valued and allows $\beta$ to be determined, from which $\lambda/\cos\theta_n$ is determinable. If $\theta_n$ is known from the direction of arrival of the incident radiation, then $\lambda$ may be determined. However, even for the case where $\theta_n$ is not measured, $\lambda$ may still be estimated with relatively high accuracy (±2.5%) over very large fields of view (90°), when n is relatively large (2.4). When R is not small (a value of R between 41% and 50% is considered as optimum) then a lookup table may be employed to determine the angle of arrival, as shown in FIG. 8, by using two or more input parameters such as:

$$S = (S_{12} + S_{34})/2S_{23}$$

$$E = 2/\pi \cot^{-1}((S_{34} - S_{12})/2S_{23}).$$

A number of CW demodulation techniques can be employed by the invention. These include, but are not limited to, sample and hold with switching and synchronous demodulation.

Figure 9A:
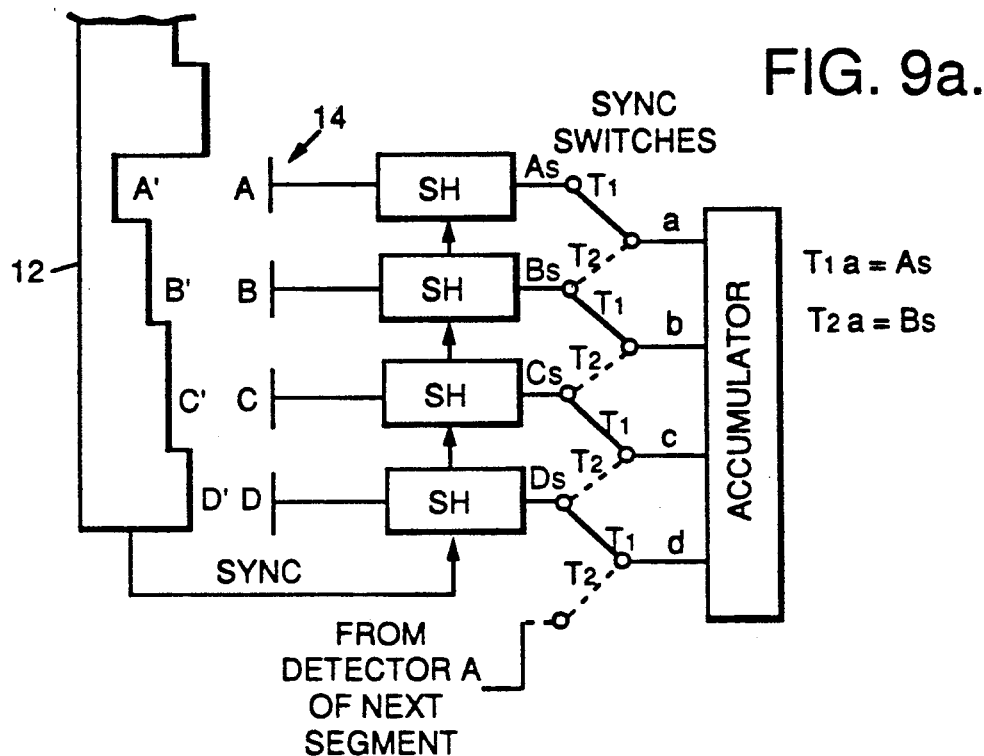
Figure 9B:
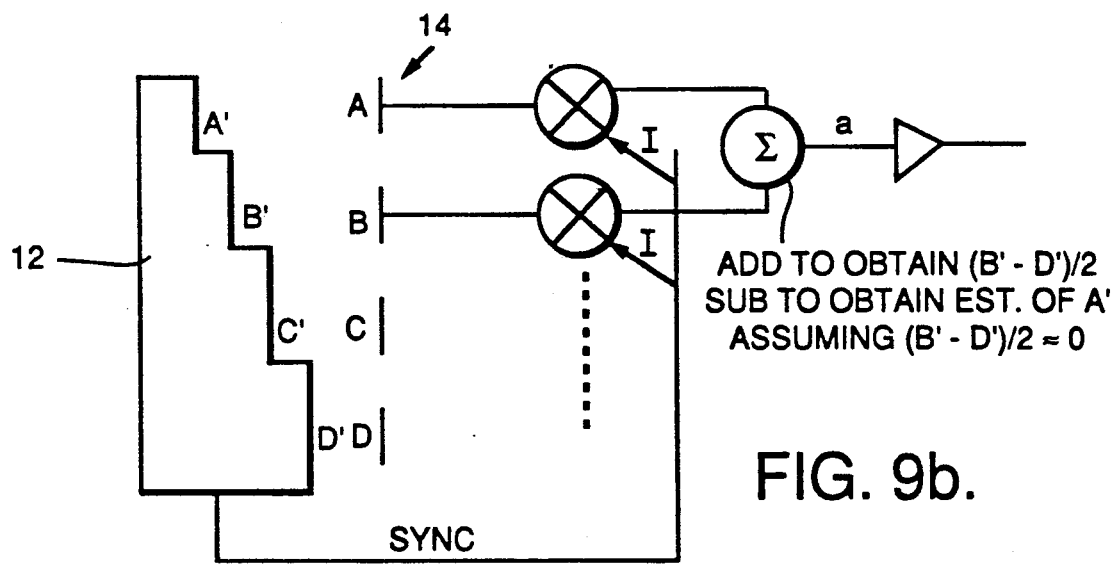
FIG. 9b is a simplified block diagram of a synchronous demodulator.

The sample and hold (SH) approach is shown in FIG. 9a and the synchronous demodulator approach is shown in FIG. 9b. Signal waveforms corresponding to the operation of the synchronous demodulator of FIG. 9b are shown in FIG. 9c wherein the operation of SYNC signal from the etalon drive is shown in greater detail.

The SH technique samples detector element A when etalon step A' is registered to detector element A, and samples detector element B when etalon step A' is registered to detector element B. The resulting output is the result of etalon step A'.

By employing a continuous signal, as opposed to a sample and hold, the same result may be achieved using synchronous demodulation, wherein the synchronization waveform I multiplies the signal on detector elements A and B. The sum of the signals gives (B'−D')/2 while the difference gives an estimate of A', plus a small error (B'+D')/2~0). However, even these small errors cancel when the differences A'−C', and B'−D', are computed. As in the embodiment of FIG. 7a, common processing may be accomplished for both pulse and CW signals before CW filtering (FIG. 7a) or the CW filter bypassed for common processing (FIG. 7b).

The methods described above are also compatible with the determination of direction of arrival (DOA) by bicell, quad cell, gray code or imaging techniques. The DOA is found by operating on the etalon 12 difference signals so that background radiation does not influence the DOA. These signals can be positive or negative. Assuming that bipolar processing is used, these signs generally cancel out (e.g. tan $\theta$ is a ratio of right minus left, to the sum of right plus left). When necessary, a polarity or sign bit is employed to correct the ± signs of the difference signals, thus preventing negative signals from giving wrong signs for the direction.

It is important that the etalon 12 be used for CW DOA, otherwise only the DOA of the background would be determined. Beneficially, the etalon 12 modulates the coherent radiation signal while nulling out the background component, such that only the coherent radiation signal DOA is measured. Thus, it is important to add etalon elements and corresponding detector elements to all CW DOA techniques so that the coherent signal is modulated while the incoherent background signal is cancelled. The gray code technique is especially desirable in that it provides a high dynamic range and also provides the DOA of the largest signal remaining after background rejection. If this largest signal is also declared to be coherent, then the DOA of the coherent signal has been determined, which is the desired result.

One suitable gray code detector for this application is disclosed in the above referenced U.S. Pat. No. 4,857,721.

Figure 10B:
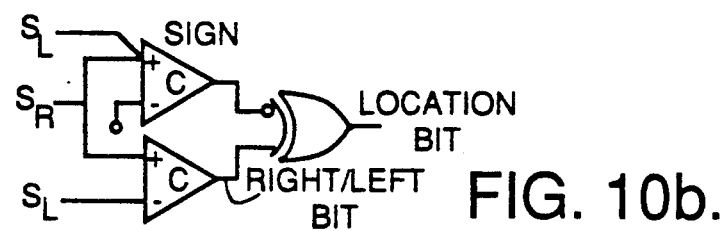

Referring to FIGS. 10a and 10b a description is provided of the DOA determination using gray code detectors. This is accomplished by replacing a conventional bicell, quad cell or gray code detector with an interdigitated gray code detector 70 that is positioned behind the stepped etalon 12. Light enters the etalon 12 through a slit 72. A lens could also be used.

In FIGS. 10a and 10b the difference signals $S_R$ and $S_L$ may be positive or negative, so that a sign or polarity bit is also measured (FIG. 10b) so that the location bit gives the correct DOA of the signal. It should be noted that $S_R$ and $S_L$ can also be added to perform coherence, and also wavelength, determination.

FIG. 11 shows an example of an X-Y (two-direction) DOA determination system 80. Reactionless drives 16 are coupled together through the resonance spring 36, as in the embodiment depicted in FIG. 3. An X-axis etalon 12a and a Y-axis etalon 12b are coupled to the drives 16 and are translated, in a direction indicated by the arrows, relative to detectors 14a and 14b. As such, the etalon steps/detector stripes are disposed at 45° relative to the the drives 16. Each of the etalons receives incident radiation through an associated slit 72a and 72b. The detector stripes are disposed perpendicularly with respect to the slits 72 such that there is no vignetting with angle of arrival.

An additional advantage of the invention is that the etalon motion need not be well controlled. For example, typical detector and etalon inter-element spacing is 160 micrometers. In that the detector 14 stripes each typically has 120 micrometers of active area, and 40 micrometers of "dead" area, a 10% error in etalon excursion (12 micrometers) is small compared to the dead space and is therefore tolerable. As such, a system constructed in accordance with the invention is insensitive to small errors in excursion.

If tight excursion control is desired, then feedback or a measurement of excursion is required. These may be accomplished in several manners.

For example, the etalon 12 may trip a switch at the end of its excursion. Another approach is to employ a capacitance gauge. Such a gauge can be integrated into the system adding metal strips to the etalon 12 and measuring the capacitance of the strips with regard to the plurality of detector 14 electrodes or similar strips placed on the detector chip. These metal strips may be entirely outside of the active radiation sensing area, or may be included within the active area to also function as masks for the etalon 12 transition regions so as to prevent optical crosstalk. Thus, it is seen that etalon motion feedback control can readily be incorporated.

While the invention has been particularly shown and described with respect to a preferred embodiment thereof, it will be understood by those skilled in the art that changes in form and details may be made therein without departing from the scope and spirit of the invention.

What is claimed is:

1. Apparatus for detecting a presence of continuous wave and/or pulse coherent radiation, comprising:
    radiation detector means having a plurality of discrete radiation detector elements disposed upon a surface thereof;
    coherence length discriminator (CLD) means having a coherence length longer than a background radiation wavelength and shorter than a wavelength of coherent signals to be detected, said CLD means including means for varying an optical path length therethrough at a plurality of locations, said CLD means being disposed relative to said radiation detector means such that radiation passing through said CLD means is received by said discrete radiation detector elements; and
    means, coupled to said CLD means, for moving said CLD means relative to said radiation detector means so as to modulate only coherent radiation passing through said CLD means.

2. Apparatus as set forth in claim 1 and further comprising means, having inputs coupled to an output of each of said discrete radiation detector elements, for demodulating the output thereof so as to determine if coherent radiation is present.

3. Apparatus as set forth in claim 2 wherein said demodulating means includes a plurality of sample and hold means each having an input coupled to one of said discrete radiation detector elements and an output switchably coupled to means for accumulating the output therefrom.

4. Apparatus as set forth in claim 2 wherein said demodulating means includes a synchronous demodulator having inputs coupled to an output of a plurality of said discrete radiation detector elements and a synchronizing input having a signal expressive of the motion of said etalon means.

5. Apparatus as set forth in claim 1 wherein said CLD means includes an etalon means.

6. Apparatus as set forth in claim 1 wherein said translating means includes a reactionless drive means.

7. Apparatus as set forth in claim 6 wherein said reactionless drive means includes a voice coil means coupled to said CLD means.

8. Apparatus as set forth in claim 1 wherein said radiation detector means is partitioned into a first radiation detector means and a second radiation detector means, wherein said CLD means is partitioned into a first etalon means and a second etalon means, and wherein said translating means is coupled to both said first and said second etalon means for simultaneously translating same relative to said first and second radiation detector means.

9. Apparatus as set forth in claim 8 wherein said translating means includes a reactionless drive means,
    wherein said reactionless drive means includes first and second voice coil means each of which is coupled to one of said etalon means, and
    wherein said reactionless drive means further includes spring means coupled between said first and second voice coil means.

10. Apparatus as set forth in claim 1 wherein said radiation detector means includes means for determining an angle of arrival of coherent radiation passing through said CLD means.

11. Apparatus as set forth in claim 10 wherein said determining means includes gray code detector means.

12. Apparatus as set forth in claim 1 wherein said radiation detector means includes means for determining the wavelength of coherent radiation.

13. Apparatus as set forth in claim 1 wherein said means for varying the optical path length through said CLD means includes a plurality of discrete steps of different heights formed on a surface thereof, each of said steps having a width.

14. Apparatus as set forth in claim 13 wherein said translating means translates said etalon means a distance equal to at least a width of one of said steps.

15. Apparatus as set forth in claim 1 wherein said CLD means includes a wedged etalon means.

16. Apparatus as set forth in claim 1 wherein said CLD means includes a Michaelson interferometer means.

17. Apparatus as set forth in claim 1 wherein said CLD means has a mean optical thickness that is greater than a coherence length of any incoherent background radiation sources while also being less than a coherence length of a coherent radiation source that it is desired to detect.

18. Apparatus as set forth in claim 13 wherein said each step has a step height that is a multiple of a basic step height and wherein the basic step height is chosen to produce, for coherent radiation having a wavelength of lambda, a lambda/4 difference in optical path length for adjacent steps.

19. Apparatus as set forth in claim 1 and further including means for subtracting from one another the output signals of two or more discrete radiation detector elements such that signal components corresponding to a coherent radiation signal add while signal components corresponding to incoherent radiation signals cancel.

20. Apparatus as set forth in claim 1 and further comprising means, having an input coupled to an output of said radiation detector means, for detecting pulsed coherent radiation.

21. Apparatus as set forth in claim 1 and further comprising means, having an input coupled to an output of said radiation detector means, for detecting continuous wave coherent radiation.

22. Apparatus as set forth in claim 2 wherein said demodulation means includes:
means for determining a difference signal between outputs of a pair of discrete radiation detector elements;
means for determining a sum of outputs of a plurality of discrete detector elements to derive an adaptive threshold signal therefrom; and
means for comparing the difference signal to the adaptive threshold signal.

23. A method of detecting a presence of a coherent radiation signal within an incoherent background signal, comprising the steps of:
providing a radiation detection means having a plurality of discrete radiation detector elements disposed upon a substantially planar surface of the radiation detector means;
translating a substantially planar etalon means so as to modulate only coherent radiation passing through said etalon means, the step of translating including a step of moving the etalon means by a distance at least equal to a dimension of one of the discrete radiation detector elements and occurring within a translation plane that is coplanarly disposed with respect to the etalon means and the planar surface of the radiation detector means; and
detecting the modulated coherent radiation with the radiation detection means.

24. A method as set forth in claim 23 wherein the step of detecting includes the steps of:
determining a difference signal between outputs of a pair of discrete radiation detector elements;
determining a sum of outputs of a plurality of discrete detector elements to derive an adaptive threshold signal therefrom; and
comparing the difference signal to the adaptive threshold signal.

25. A method as set forth in claim 23 wherein the step of detecting includes a further step of determining an angle of arrival of the coherent radiation.

26. A method as set forth in claim 23 wherein the step of detecting detects CW coherent radiation.

27. A method as set forth in claim 23 wherein the step of detecting detects pulsed coherent radiation.

28. A method as set forth in claim 23 wherein the step of detecting includes a step of determining a wavelength of the coherent radiation.

29. A method as set forth in claim 23 wherein the step of detecting detects both pulsed coherent radiation and CW coherent radiation.

30. A method as set forth in claim 23 wherein the step of translating includes a step of operating a reactionless drive means.

31. A method as set forth in claim 23 wherein the step of detecting includes a step of operating a pyroelectric detector means.

32. A method as set forth in claim 25 wherein the step of determining an angle of arrival includes a step of operating a detector means having a gray encoded output.

* * * * *